United States Patent
Sadakane et al.

(10) Patent No.: US 7,663,270 B2
(45) Date of Patent: Feb. 16, 2010

(54) CANNED LINEAR MOTOR ARMATURE AND CANNED LINEAR MOTOR

(75) Inventors: Kenichi Sadakane, Fukuoka (JP); Toru Shikayama, Fukuoka (JP); Tatsuo Abe, Fukuoka (JP); Akio Sakai, Fukuoka (JP); Shusaku Yoshida, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 379 days.

(21) Appl. No.: 11/597,249

(22) PCT Filed: Apr. 1, 2005

(86) PCT No.: PCT/JP2005/006513

§ 371 (c)(1), (2), (4) Date: Nov. 20, 2006

(87) PCT Pub. No.: WO2005/112233

PCT Pub. Date: Nov. 24, 2005

(65) Prior Publication Data

US 2007/0252444 A1 Nov. 1, 2007

(30) Foreign Application Priority Data

May 18, 2004 (JP) ............................. 2004-148203

(51) Int. Cl.
*H02K 41/02* (2006.01)
(52) U.S. Cl. ............... 310/12.29; 310/12.23; 310/12.33
(58) Field of Classification Search .................. 310/15, 310/17, 20, 12.21, 12.23, 12.29, 12.33
See application file for complete search history.

(56) References Cited

U.S. PATENT DOCUMENTS

| | | | | |
|---|---|---|---|---|
| 1,938,917 A | * | 12/1933 | Loetscher | .................. 428/213 |
| 4,769,514 A | * | 9/1988 | Uematsu et al. | ......... 174/102 A |
| 4,794,284 A | * | 12/1988 | Buon | ...................... 310/12.19 |
| 5,115,556 A | * | 5/1992 | Gavrilidis et al. | ............. 29/596 |
| 5,783,877 A | * | 7/1998 | Chitayat | .................. 310/12.33 |
| 6,639,333 B1 | * | 10/2003 | Kamata et al. | ................ 310/12 |
| 6,979,920 B2 | * | 12/2005 | Reynolds et al. | .............. 310/54 |

(Continued)

FOREIGN PATENT DOCUMENTS

| | | |
|---|---|---|
| CN | 2544097 Y | 4/2003 |
| JP | 2000-4572 A | 1/2000 |
| JP | 2001-25227 A | 1/2001 |
| JP | 2002-10618 A | 1/2002 |
| JP | 2002-27730 A | 1/2002 |
| JP | 2002-320374 A | 10/2002 |

OTHER PUBLICATIONS

JPO Machine Translation, Matsuki JP 2002-010618 Nov. 2002.*
Chinese Office Action dated Mar. 6, 2009.

*Primary Examiner*—Burton Mullins
(74) *Attorney, Agent, or Firm*—Sughrue Mion, PLLC

(57) ABSTRACT

In the canned linear motor armature, both the side surfaces of the armature winding (18) are fixed by two winding fixing frames (4) so as to sandwich the armature winding in between them in the longitudinal direction. A refrigerant passage (5) is provided in a space between the can (3) and the winding fixing frame (4). A seal material (24) is provided in a gap between a case (2) and the winding fixing frame (4) to prevent a refrigerant supplied to the refrigerant passage (5) from leaking to the armature winding (18) sandwiched in between the two winding fixing frames (4) to impregnate the armature winding (18) with the refrigerant. A waterproof film is adhered onto a surface of the winding fixing frame (4) where the refrigerant comes into contact.

9 Claims, 9 Drawing Sheets

U.S. PATENT DOCUMENTS

| | | | |
|---|---|---|---|
| 7,218,020 B2 * | 5/2007 | Emoto | 310/12 |
| 2002/0047314 A1 * | 4/2002 | Takedomi | 310/12 |
| 2003/0020340 A1 * | 1/2003 | Shikayama et al. | 310/58 |
| 2004/0032170 A1 * | 2/2004 | Tamai et al. | 310/13 |
| 2004/0080217 A1 * | 4/2004 | Ota et al. | 310/12 |
| 2007/0252445 A1 * | 11/2007 | Shinohira et al. | 310/12 |

* cited by examiner

FIG. 15
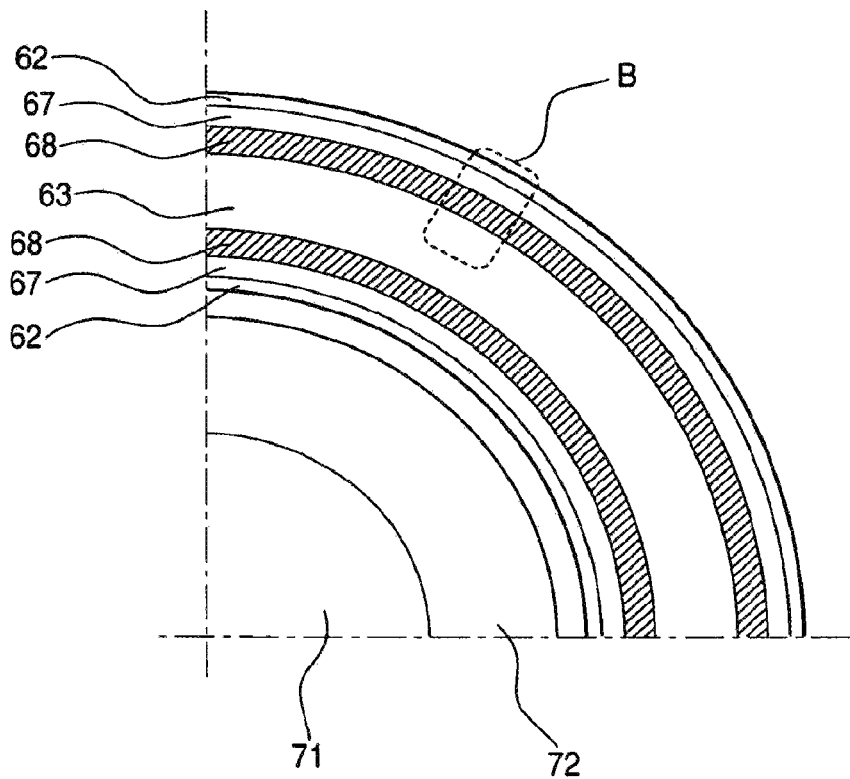
Prior Art   FIG. 16
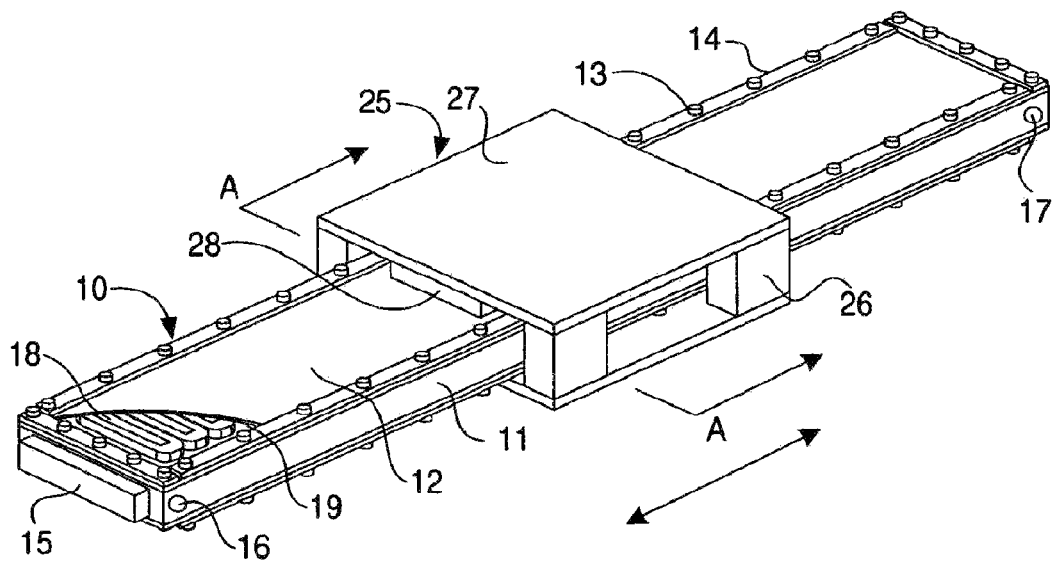

CANNED LINEAR MOTOR ARMATURE AND CANNED LINEAR MOTOR

TECHNICAL FIELD

The present invention relates to a canned linear motor armature and a canned linear motor that are used for a table feeding in semiconductor manufacturing apparatuses or in machine tools, in which a reduction of a temperature rise of a linear motor main body and a reliability of a long-period insulation are required.

BACKGROUND ART

For instance, Patent Document 1 and Patent Document 2 disclose canned linear motor armatures and canned linear motors that have been hitherto used for the table feeding in the semiconductor manufacturing apparatuses or the machine tools, in which an armature winding is covered by a can and a refrigerant is supplied to flow through a refrigerant passage provided between the armature winding and the can, thereby recovering a heat generated from the armature winding by the refrigerant and reducing the temperature rise of a surface of the linear motor. Here, the linear motor disclosed in the Patent Document 1 will be described below with reference to the drawings.

Patent Document 1: JP-A-2002-27730 (page 4, FIG. 1)

Patent Document 2: JP-A-2000-4572

FIG. 16 is an entire perspective view of the canned linear motor showing a related art. In FIG. 16, reference numeral 10 designates a stator, 11 designates a case, 12 designates a can, 13 designates a bolt screw for fixing the can, 14 designates a pressing plate, 15 designates a terminal base, 16 designates a refrigerant supply port, 17 designates a refrigerant discharge port, 18 designates an armature winding, 25 designates a movable element, 26 designates a field yoke support member, 27 designates a field yoke, and 28 designates a permanent magnet. One movable element 25 includes the two flat plate shaped field yokes 27, the permanent magnets 28 respectively attached to the surfaces of the field yokes 27 and a total of four field yoke support members 26 inserted between the two field yokes 27, and has a hollow space part whose both ends are opened. The above-described permanent magnet 28 has, a plurality of magnets that are arranged adjacently on the field yoke 27 so that polarities are alternately different. The movable element 25 is supported by a linear guide or a static pressure bearing guide using balls and composed of sliders and guide rails not shown in the drawing.

Further, the other stator 10 has armatures arranged in the hollow space part of the movable element 25 so as to be opposed to the permanent magnets 28 of the movable element 25 through magnetic gaps. The detail thereof will be described below by referring to FIG. 17.

FIG. 17 is a front sectional view of the canned linear motor in the related art taken along a line A-A of FIG. 16. FIG. 18 shows a structure of an inner part of the stator except the can 12 in FIG. 17. In FIGS. 17 and 18, the stator 10 includes the frame shaped metallic case 11 having a hollow inner part, the plate shaped can 12 having the outer shape of the case 11 to cover the hollow part of the case 11 therewith, the bolt screws 13 for fixing the can 12 to the case 11, the pressing plate 14 having through holes of the bolt screws 13 to press the can 12 by an equal load, the three-phase armature winding 18 forming the armature arranged in the hollow part of the case 11, a winding fixing frame 19 for fixing the armature winding 18, an O ring 21 formed to be slightly larger than the edges of the case 11 and the can 12 and bolt screws 23 for fixing the winding fixing frame 19 to the case 11. As the material of the can 12 and the winding fixing frame 19, a resin is employed. Here, a thermosetting resin such as an epoxy resin or a thermoplastic resin such as polyphenylene sulfide (PPS) is used. The form of the cavity part of the case 11 is configured so as to surround the outer periphery of the armature winding 18. The armature windings 18 are arranged on both the surfaces of the winding fixing frame 19 formed in a flat plate shape. The winding fixing plate 19 formed integrally with the armature windings 18 is arranged in the hollow part of the case 11 and fixed to the case 11 by the bolt screws 23. On the edges of the front and back sides of the case 11, circulating grooves are provided and the O rings 21 are provided therein. Then, the cans 12 are arranged on the front and back parts of the case 11 so as to cover the case 11 therewith. The pressing plate 14 is laid on the can 12 along the edge of the case 11 and fastened by the bolt screws 13 so that the can 12 is fixed to the case 11. The armature winding 18 is composed of a plurality of groups of coils having concentrated winding coils prepared for three phases and attached to both the sides of the winding fixing frame 19. An electric power is supplied to the armature winding 18 from the terminal base 15 attached to the case 11. The terminal base 15 is electrically connected to the armature winding 18 by a lead wire (not shown in the drawing). Further, a refrigerant is supplied from the refrigerant supply port 16 provided in the case 11 and discharged from the refrigerant discharge port 17. During that time, the refrigerant is allowed to flow in a refrigerant passage 20 located between the armature winding 18 and the can 12 to cool the armature winding 18 that generates heat.

In the canned linear motor constructed as described above, a three-phase alternating current corresponding to the electric relative position of the movable element 25 and the stator 10 is supplied to the armature winding 18 so that a thrust is generated in the movable element 25 by an action on a magnetic field formed by the permanent magnet 28. Thus, the movable element 25 moves in an advancing direction shown by an arrow mark in FIG. 16. At this time, since the armature winding 18 in which heat is generated by a copper loss is cooled by the refrigerant supplied to the refrigerant passage 20, the rise of the surface temperature of the can 12 can be suppressed.

DISCLOSURE OF THE INVENTION

Problems that the Invention is to Solve

However, in the canned linear motor armature and the canned linear motor in a related art, the refrigerant supplied to the refrigerant passage 20 flows on the surface of the armature winding 18, so that below described problems arise.

(1) The usual canned linear motor has used a fluorine type inert refrigerant (for instance, hydrofluoric ether (HFE) produced by Sumitomo 3M Ltd.) as a refrigerant. Since the electric conductivity of the HFE is extremely low as small as 0.002 ($\mu$S/cm), the HFE is effective as the refrigerant that can directly cool the armature winding without generating a breakdown. However, while the thermal conductivity of the HFE is 0.07 (W/(m·k)), water has the thermal conductivity of 0.6 (W/(m·k)) about 8 times as high as that of the HFE, so that the HFE is outstandingly lower than the water and a heat transfer rate between the armature winding and the HFE is low. As a result, a quantity of heat transfer from the armature winding to the refrigerant is decreased, and at the same time, a quantity of heat transfer to the surface of the can is increased. Accordingly, the temperature of the surface of the can is elevated.

(2) As a countermeasure for solving the above-described problem of (1), a change may be considered to the water as a refrigerant of a high thermal conductivity. Since the thermal conductivity of the water is about 8 times/(m·k) as high as that of the HFE as described above, it is possible to greatly reduce the rise of the surface temperature of the can. However, when the water is used as the refrigerant, another problem arises. Generally as a conductor forming the armature winding, an enamel wire having a coating layer for insulation is used. At that time, very small scars (pin holes) exist on the coating layer of the conductor owing to a contact between the conductor and other object that arises during a winding operation or fixing the armature winding. When pure water having the electric conductivity exceeding 1 (μS/cm) is used as the refrigerant, the breakdown is generated from the parts of the large pin holes. Further, even when the diameter or the depth of the pin hole is very small, the pin hole is enlarged due to a reaction (a mechanical stress) of a thrust exerted on the armature winding, a heat generation (a thermal stress) of the winding by applying a current, a water tree phenomenon by applying voltage during a water immersion or the like, and the breakdown is generated in a short time.

(3) In order to obtain a cooling capability equal to the water by using the refrigerant (HFE) low in its electric conductivity, two kinds of methods may be considered that the thickness of the can is reduced and the sectional area of the refrigerant area is increased to decrease a thermal resistance from the armature winding to the surface of the can or the supply pressure of the refrigerant is increased to increase a flow rate. However, when the thickness of the can is reduced, the deformation of the can (a quantity of bulge of the can toward the gap) is increased by the pressure of the refrigerant. When the supply pressure of the refrigerant is increased without changing the thickness of the can, the deformation of the can is similarly increased. As a result, both the thickness of the can and the flow rate of the refrigerant cannot be changed and the rise of the surface temperature of the can cannot be decreased.

The present invention is devised to solve the above-described problems, and it is an object of the present invention to provide a canned linear motor armature and a canned linear motor in which an armature winding can be cooled by water, which has an extremely high cooling capability, by improving a long-time reliability of an insulation of the armature winding with respect to a refrigerant, and can suppress a deformation amount of a can to a magnetic gap between a movable element and a stator.

Means for Solving the Problems

In order to solve the above-described problems, an aspect of the present invention provides a canned linear motor armature including: an armature winding that is formed in a flat plate shape and includes a plurality of groups of coils; a case that is made of metal and is provided so as to surround the armature winding in a frame shape; and cans that seal respective opening portions of the case, wherein said canned linear motor armature further comprises: two winding fixing frames that fix respective side surfaces of the armature winding so as to sandwich the armature winding therebetween in a longitudinal direction; a refrigerant passage that is provided in a space between the cans and respective winding fixing frames; a seal material that is provided in a gap between a refrigerant passage side of each of the winding fixing frames and the case; and a waterproof film that is adhered onto a surface of each of the winding fixing frames where a refrigerant comes into contact.

More specifically each of the cans are previously curved, and the cans are disposed such that each of curved convex surfaces of the respective cans is opposed to the winding fixing frames.

More specifically, the winding fixing frame that fixes the armature winding is formed by a connection board, and a second seal material is filled into a gap part between the winding fixing frame and a terminal base which connects a motor lead of the armature winding to an external part so as to cover the motor lead.

More specifically a pressing plate that fixes the pair of cans is made of a resin.

Still more specifically, the invention includes a field yoke that is disposed so as to oppose to the armature, interposing a magnetic gap therebetween, and that includes a plurality of permanent magnets arranged such that each permanent magnet has a different polarity with the adjacent permanent magnet, wherein either one of the armature or the field yoke is considered to be a stator and the other is considered to be a movable element, and the field yoke and the armature move relatively to each other.

Still more specifically, the present invention provides a linear motor armature including: an armature winding that includes a plurality of groups of coils; a can that is provided on one surface or both surfaces of the armature winding; and a refrigerant passage that is formed between the armature winding and the can, wherein an insulating laminated body, in which resin layers are laminated in multi-layers, is interposed between the armature winding and the refrigerant passage.

More specifically, a metal layer is laminated on the resin layers of the insulating laminated body.

Even more specifically, the resin layers are filled with a glass fiber or a carbon fiber.

More specifically, the metal layer is formed by a metal foil tape having a metal foil and an adhesive agent or a pressure sensitive adhesive.

More specifically the present invention further includes a post provided in the refrigerant passage, wherein the post fixes the can and the resin layers.

More specifically the can is previously curved, and a curved convex surface of the can is arranged to be directed to a refrigerant passage side.

More specifically, the invention includes a field magnet that is disposed so as to oppose to the armature interposing a magnetic gap therebetween, and that includes a plurality of permanent magnets arranged such that each permanent magnet has a different polarity with the adjacent permanent magnet, wherein either one of the armature or the field magnet is considered to be a stator and the other is considered to be a movable element and the field magnet and the armature move relatively to each other.

More specifically, the armature and the field magnet are formed in a flat plate shape.

More specifically the armature and the field magnet are formed in a cylindrical shape.

ADVANTAGES OF THE INVENTION

According to the canned linear motor of the present invention, the following effects can be obtained.

According to the invention defined in claim 1, the armature winding does not come into contact with the refrigerant. That is, even when water as a refrigerant low in its electric conductivity is used or pin holes are formed in the conductor of the armature winding, since the armature winding is isolated from the water by the winding fixing frame, a breakdown by the water can be prevented. Further, since the water is used as the refrigerant, a cooling capability is improved. Thus, it is possible to reduce the temperature rise on the surface of can.

Further, the deterioration of an insulation resistance due to the impregnation of the winding fixing frame with the refrigerant can be prevented.

Further, according to the invention defined in claim 2, since a quantity of bulge of the can to the gap opposed to the movable element under the pressure of the refrigerant is decreased, a flow rate of the refrigerant can be increased, and it is possible to further reduce the temperature rise on the surface of the can compared with the structure defined in claim 1.

Further, according to the invention defined in claim 3, the deterioration of the insulation resistance can be prevented and a reliability of an insulation performance can be improved by using together with the invention defined in claim 1 or claim 2.

Further, according to the invention, the rise of the temperature on the surface of the pressing plate made of the resin for fixing the can may be more lowered than that made of metal.

Further, according to the invention, since the can is previously configured in the curved shape, the armature is obtained in which the armature winding has a high insulation resistance for the refrigerant and the rise of the surface temperature of the can is low by using the water high in its cooling capability as the refrigerant, and the field yoke is opposed to the armature so that the canned linear motor having no heat generation can be obtained.

According to the invention, the resin layers are laminated in the multi-layers and interposed between the armature winding and the refrigerant passage, so that the resin layers play the role of a refrigerant insulation resistance and the deterioration of the insulation resistance can be suppressed under an immersion in water having a high electric conductivity to prevent the breakdown for a long period. Further, since the resin layers are formed in the multi-layers, an outer resin layer plays the role of protection so that scars (pin holes) in an inner resin layer can be prevented from being directly immersed in water. Therefore, even when the pin holes are formed in the armature winding or the inner resin layer or a mechanical stress (a reaction of a thrust) or a thermal stress (a heat generation of a winding) acts or a high voltage is applied during a manufacturing operation, the progress of the pin holes to cracks can be suppressed and a reliability for insulation can be improved. As a result, the water as the refrigerant high in its cooling capability can be used and the rise of the temperature on the surface of the linear motor can be decreased.

According to the invention defined in claim 7, the metal layer and the resin layers are laminated and interposed between the armature winding and the refrigerant passage. Since the resin layers are interposed between the armature winding and the refrigerant passage, the same effects as those of the invention defined in claim 6 can be obtained. Further, since the metal layer shuts off the absorption of the refrigerant to an inner part, the deterioration of the insulation resistance arising by the absorption of the refrigerant to the resin layers can be prevented. Accordingly, the deterioration of the insulation resistance is more eliminated than that of claim 1 and the reliability for the insulation can be ensured for a long period.

According to the invention, since the resin layers are filled with glass fibers or carbon fibers, the mechanical strength of the resin layers can be increased. Even when the reaction of the thrust acts on the armature winding formed integrally with the resin layers, the generation of cracks on the resin layers can be prevented and the breakdown due to the immersion of the refrigerant to crack generating parts can be prevented.

According to the invention, since the metal layer is formed with an extremely thin metal foil tape, the thickness of the lamination of the resin layers and the metal layer can be decreased. The thickness of the refrigerant passage is increased the more for the decrease of the thickness of the lamination, so that the rise of the temperature on the surface of the linear motor can be lowered.

According to the invention, posts are provided in the refrigerant passage to mechanically fix the can and the resin layers by the posts. Accordingly, even when pressure in the refrigerant passage is elevated owing to the increase of the flow rate of the refrigerant, a deformation amount of the can may be suppressed. Therefore, the flow rate of the refrigerant can be increased and the rise of the temperature on the surface of the linear motor can be more decreased.

According to the invention, the can is previously curved and the convex surface of the can is arranged to be directed to the refrigerant passage side. Accordingly, even when the pressure in the refrigerant passage is elevated, a quantity of bulge of the can to an outer part can be suppressed. Therefore, the flow rate of the refrigerant can be increased and the rise of the temperature on the surface of the linear motor can be decreased. Further, as compared with the invention defined in a previous embodiment, since members such as the posts are not used, a manufacture can be easily and inexpensively carried out.

According to the invention, the armature is opposed to a field magnet having permanent magnets and one of the armature and the field magnet is considered to be a stator and the other is considered to be a movable element. Accordingly, the linear motor having the effects described above can be provided.

According to the invention, since the armature winding forming the armature and the permanent magnets forming the field magnet are formed in flat plate shapes. Accordingly, the flat linear motor having the effects described above can be provided.

According to the invention, since the armature winding forming the armature and the permanent magnets forming the field magnet are formed in cylindrical shapes. Accordingly, the linear motor of a small volume having the effects described above can be provided.

BRIEF DESCRIPTION OF THE DRAWINGS

FIGS. 7A and 7B show a canned linear motor showing third to eighth embodiment of the present invention, wherein FIG. 7A is an entire perspective view thereof and FIG. 7B is a front sectional view showing a section cut to ¼ along a line A-A' in FIG. 7A.

FIG. 15 is a front sectional view showing a section cut to ¼ along a line A-A' in FIG. 14.

FIG. 16 is an entire perspective view of a canned linear motor showing the related art.

Figure 1:
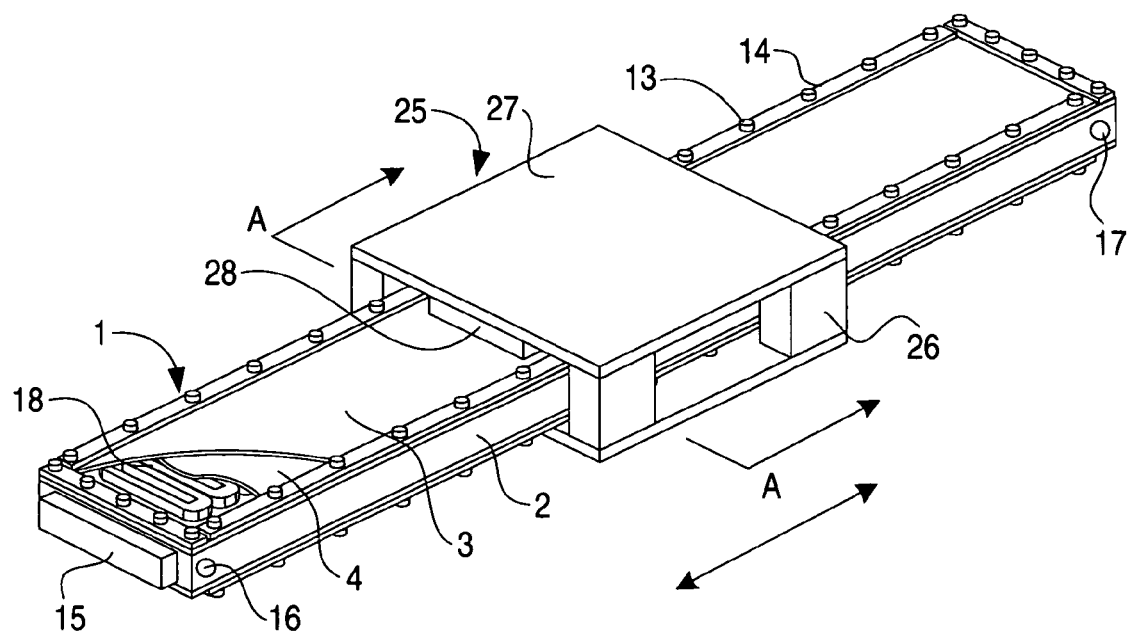
FIG. 1 is an entire perspective view of a canned linear motor showing a first embodiment of the present invention.

DESCRIPTION OF REFERENCE NUMERALS AND SIGNS 1,10 stator
2,11 case
3, 3a, 12 can
4,19 winding fixing frame
5, 5a, 20 refrigerant passage
6, 23 bolt screw
13 bolt screw
14 pressing plate
15 terminal base
16 refrigerant supply port
17 refrigerant discharge port
18 armature winding
21 O ring
22 winding fixing frame support member
24 seal material
25 movable element
26 field yoke support member
27 field yoke
28 permanent magnet
29 waterproof film
31 motor lead
32 seal material
40 insulating laminated body
41 protecting resin layer
42 adhesive resin layer
43 main insulating resin layer
44 mold resin layer
45 metal layer
46 metal foil tape
47 high strength insulating resin layer
50 post
51 O ring for post
52 post fixing bolt
53 post fixing insert nut
54 can for post
55 curved can
60 movable element
61 case
62 can
63 armature winding
64 terminal base
65 refrigerant supply port
66 refrigerant discharge port
67 refrigerant passage
68 insulating laminated body
70 stator
71 field yoke
72 permanent magnet

BEST MODE FOR CARRYING OUT THE INVENTION

Hereinafter, embodiments of the present invention will be described in detail with reference to the drawings.

Embodiment 1

Figure 2:
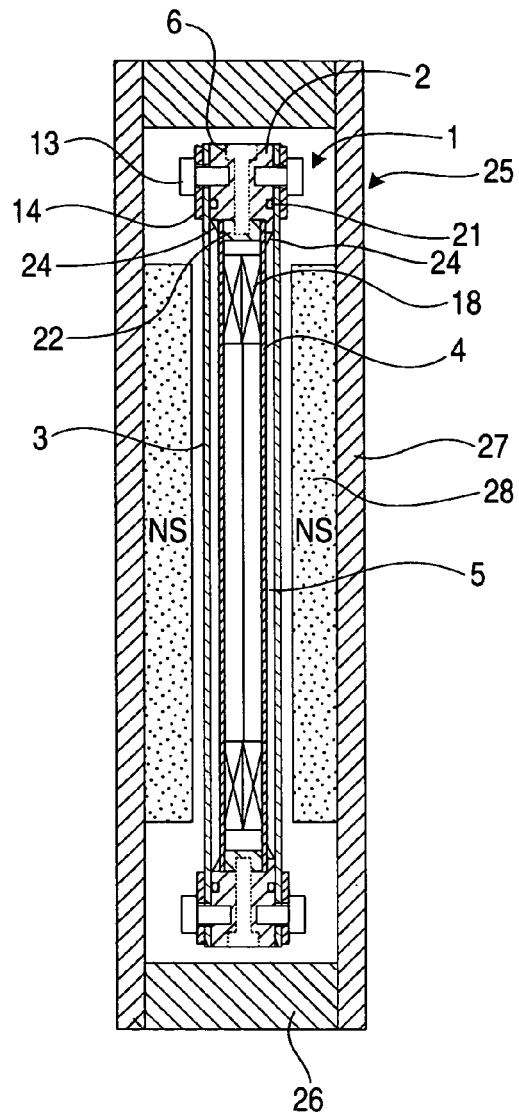
FIG. 2 is a front sectional view of the canned linear motor taken along a line A-A of FIG. 1.
Figure 3:
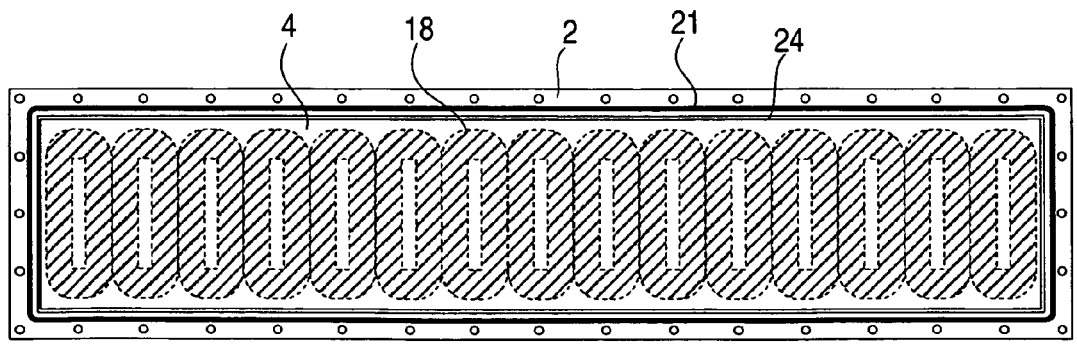
FIG. 3 is a side view showing an inner structure of a stator shown in FIG. 1, in which a can is removed.

FIG. 1 is a perspective view of a canned linear motor showing a first embodiment of the present invention. FIG. 2 is a front sectional view of the canned linear motor in the present invention taken along a line A-A of FIG. 1. FIG. 3 is a side view showing an inner structure of a stator shown in FIG. 1, in which a can is removed. Components of the present invention the same as those of a related art are designated by the same reference numerals and an explanation of them will be omitted and only different points will be described. Further, the structure of a movable element 25 is the same as that of the related art.

In FIGS. 1 to 3, reference numeral 1 designates a stator, 2 designates a case, 3 designates a can, 4 designates a winding fixing frame, 5 designates a refrigerant passage, 6 designates a bolt screw, 22 designates a winding fixing frame support member, and 24 designates seal material.

The present invention has features as described below.

That is, the feature of the present invention resides in that both the side surfaces of an armature winding 18 are fixed in the longitudinal direction by two winding fixing frames 4 so as to sandwich the armature winding in between the winding fixing frames 4, and the refrigerant passage 5 is provided in a space formed between the can 3 and the winding fixing frame 4.

Further, in a gap between the refrigerant passage side of the winding fixing frame 4 and the case 2, the seal material 24 is provided so that a refrigerant supplied to the refrigerant passage 5 is prevented from leaking to the armature winding 18 sandwiched in between the two winding fixing frames 4 to impregnate the armature winding 18 with the refrigerant.

Further, in the upper and lower parts of the armature winding 18, winding fixing frame support members 22 are inserted to support and fix the upper and lower end parts of the two winding fixing frames 4 and the inner peripheral side of the case 2. The case 2 and the winding fixing frame support members 22 are fixed by inserting the bolt screws 6 into through holes provided in the case 2 and then screwing the bolt screws 6 to female screws of the winding fixing frame support members 22. The views of the through holes and the female screws are omitted.

Figure 4:
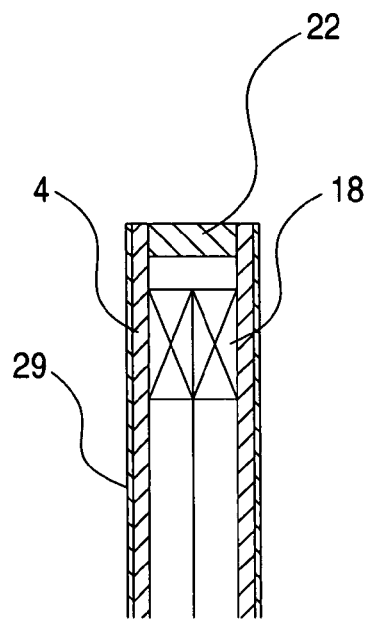
FIG. 4 is a partly sectional view with the surface of a winding fixing frame shown in FIG. 2 enlarged.

Further, the surfaces of the winding fixing frames 4 are shown in FIG. 4.

FIG. 4 shows a partly sectional view in which the surfaces of the winding fixing frames shown in FIG. 2 are enlarged. In FIG. 4, 18 designates the armature winding, 22 designates the winding fixing frame support member, 4 designates the winding fixing frame, and 29 designates a waterproof film.

Namely, the waterproof film 29 is adhered onto the surface of the winding fixing frame 4 where the refrigerant comes into contact.

Figure 5:
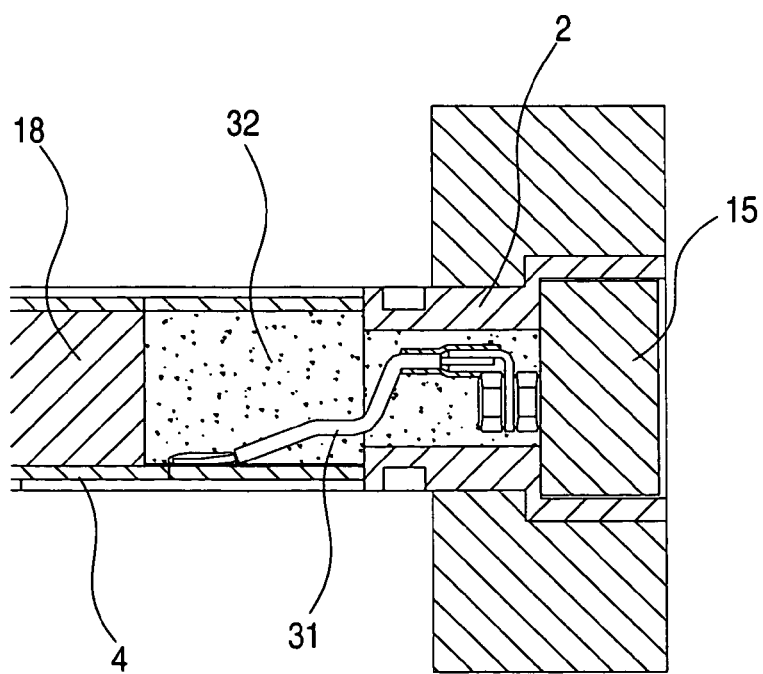
FIG. 5 is a partly sectional view with a motor lead connection part enlarged.

Still further, a motor lead connection part is shown in FIG. 5.

FIG. 5 is a partly sectional view in which the motor lead connection part is enlarged. In FIG. 5, reference numeral 2 designates the case, 4 designates the winding fixing frame, 18 designates the armature winding, 15 designates a terminal base, 31 designates a motor lead, and 32 designates a seal material.

Namely, the winding fixing frame 4 for fixing the armature winding 18 is formed by a connection board. A gap part between the winding fixing frame 4 and the terminal base 15 for connecting the motor lead 31 of the armature winding 18 to an external part is filled with the seal material 32 so as to cover the motor lead 31 therewith.

A pressing plate 14 for fixing the can 3 is made of a resin having a thermal conductivity lower than that of metal.

In the above-described construction, since the structure of the coil of the armature winding 18 is the same as that of the related art, in the canned linear motor of the present invention as in the related art, a prescribed current corresponding to the electrically relative position between the movable element 25 and the stator 1 is supplied to the armature winding 18 so that the current acts on a magnetic field formed by a permanent magnet 28 to generate a thrust in the movable element. At this time, the refrigerant flows in the refrigerant passage 5 provided between the can 3 and the winding fixing frame 4 to cool the armature winding 18 that generates heat.

Accordingly, since the first embodiment of the present invention has the structure in which both the side surfaces of the armature winding 18 are fixed in the longitudinal direction by the two winding fixing frames 4 so as to sandwich the armature winding in between the winding fixing frames, the structure in which the refrigerant passage 5 is provided in the space formed between the can 3 and the winding fixing frame 4 and the structure in which the seal material 24 is provided in the gap between the refrigerant passage side of the winding fixing frame 4 and the case 2, a contact of the refrigerant with the armature winding 18 that has been a problem in the related art can be eliminated. That is, even when water is used as the refrigerant low in its electric conductivity, since the armature winding 18 is isolated from the water by the winding fixing frame 4 and the seal material 24, the breakdown of the armature winding 18 can be prevented. When the water is used as the refrigerant, a cooling capability is improved. Thus, the rise of temperature on the surface of the can 3 can be decreased.

Further, since the waterproof film 29 is adhered onto the surface of the winding fixing frame 4 where the refrigerant comes into contact, the deterioration of an insulation resistance due to the penetration of the refrigerant into the winding fixing frame can be prevented.

Further, since the gap part between the armature winding 18 and the terminal base 15 for connecting the motor lead of the armature winding 18 to the external part is filled with the seal material 32 so as to cover the motor lead 31 therewith, the deterioration of the insulation resistance can be prevented and a reliability for an insulation performance can be improved.

Further, as a material of the pressing plate for fixing the can, a resin having a thermal conductivity lower than that of metal is used. Thus, the rise of temperature on the surface of the pressing plate made of the resin for fixing the can be decreased more than that made of metal.

Embodiment 2

Now, a second embodiment of the present invention will be described below.

Figure 6:
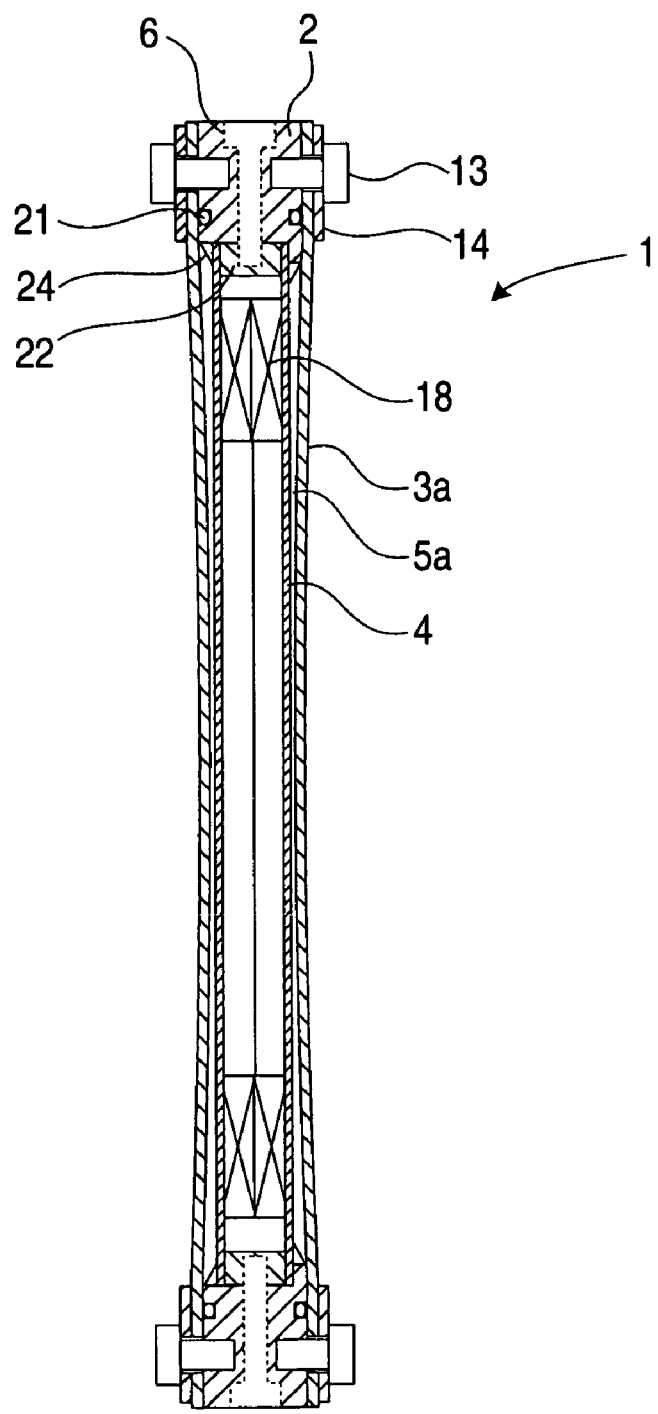
FIG. 6 is a front sectional view of a stator of a canned linear motor showing a second embodiment of the present invention.

FIG. 6 is a front sectional view of a stator of a canned linear motor showing a second embodiment of the present invention.

The second embodiment is different from the first embodiment in that while the can 3 of the first embodiment is a linear plate, each of the cans is previously curved and the curved convex surfaces of the cans are arranged to be opposed to winding fixing frames 4. In FIG. 6, reference numeral 3a designates a previously curved can, and 5a designates a refrigerant passage formed in a space part between the curved can 3a and the winding fixing frame 4. That is, the can 3a is formed in a shape such that a central part thereof is slightly curved toward the winding fixing frame 4 side so as not to come into contact with the winding fixing frame when a refrigerant is not supplied to the refrigerant passage 5a. When the refrigerant is supplied to the refrigerant passage 5a, the can 3a is deformed in such a way that the central part protrudes outside (a side opposite to the winding fixing frame 4) under the pressure of the refrigerant.

Accordingly, since the can 3a has the previously curved form, the deformation of the can to a gap opposed to a movable element owing to the flow rate of the refrigerant can be suppressed as an effect more excellent than that of the first embodiment. Further, the flow rate of the refrigerant can be increased more than that of the first embodiment and the rise of temperature can be more decreased.

In the above-described embodiment, the structure is mentioned that includes the armature winding as the stator and the permanent magnets for the field magnet as the movable element. However, an inverse structure may be employed that has the permanent magnet as the stator and the armature winding as the movable element.

Further, the movable element is formed in a rectangular shape having a hollow, however, it is apparent that the present invention may be applied with the movable element having a recessed form or a structure in which permanent magnets are merely arranged in one side.

Embodiment 3

Figure 7A:
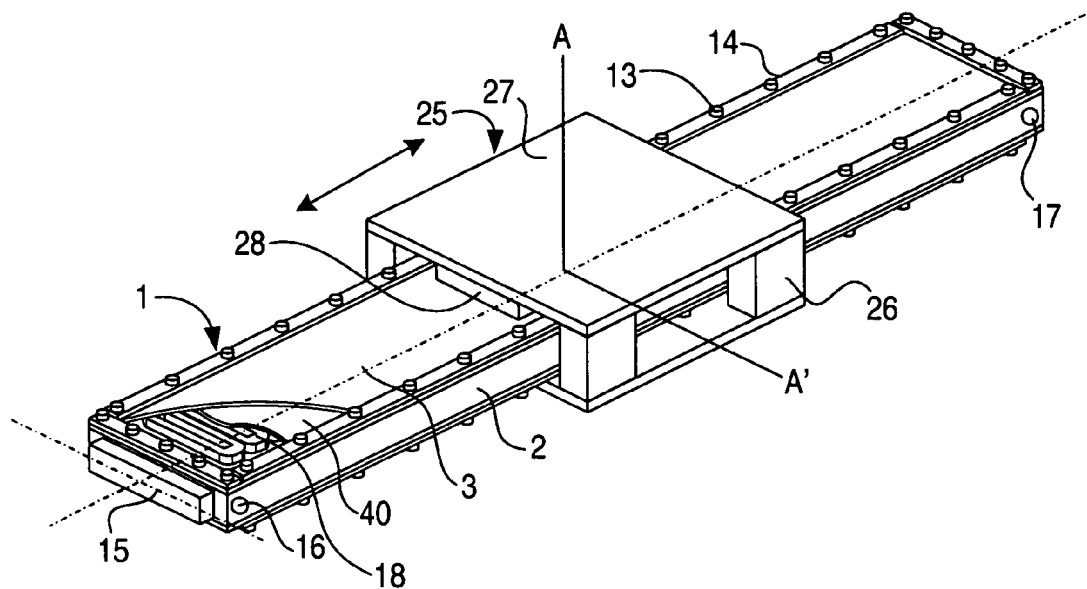
Figure 7B:
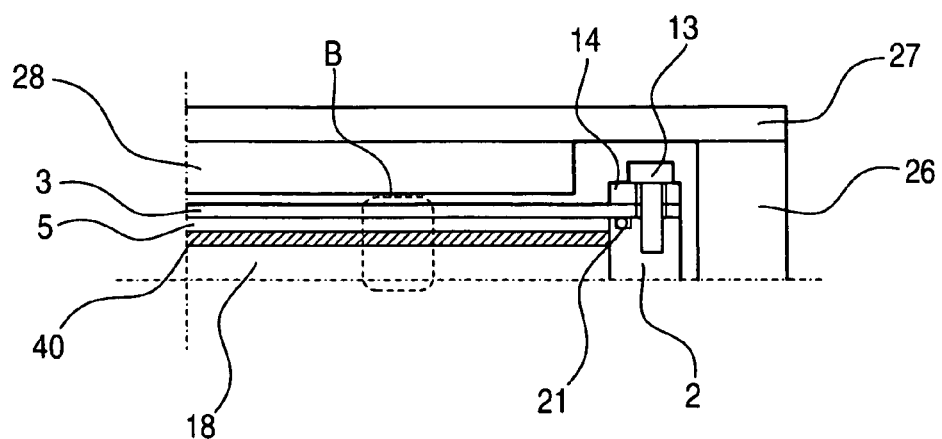

FIGS. 7A and 7B illustrate a canned linear motor showing a third embodiment of the present invention, wherein FIG. 7A is an entire perspective view thereof and FIG. 7B is a front sectional view showing a section cut to ¼ along a line A-A' in FIG. 7A. The components of the present invention the same as those of the related art are designated by the same reference numerals and described.

In the drawing, reference numeral 40 designates an insulating laminated body formed by laminating resin layers in multi-layers. The structure of a movable element 25 of the present invention is the same as that of the related art. A stator 1 includes a metallic case 2 formed in a rectangular shape having a hollow inner part, a plate shaped can 3 having the outer shape of the case 2 to cover the hollow part of the case 2 therewith, a can fixing bolt 13 for fixing the can 3 to the case 2, a pressing plate 14 having through holes of the can fixing bolts 13 to press the can 3 by an equal load, a three-phase armature winding 18 and the insulating laminated body 40 arranged in the hollow part of the case 2 and an O ring 21 formed to be slightly larger than the hollow part of the case 2.

As the material of the can 3, a resin is employed. For instance, a thermosetting resin such as an epoxy resin or a thermoplastic resin such as polyphenylene sulfide (PPS) is used. The form of the hollow part of the case 2 is configured so as to surround the outer periphery of the armature winding 18. An armature fixing part (not shown in the drawing) formed integrally with the armature winding 18 is arranged in the hollow part of the case 2 and the wiring fixing part and the case 2 are fixed by bolts. On the edges of the front and back parts of the case 2, circulating grooves are provided and the O rings 21 are provided therein. Then, the cans 3 are arranged on the front and back parts of the case 2. The pressing plate 14 is laid on the can 3 along the edge of the case 2 and fastened by the can fixing bolts 13 so that the can 3 is fixed to the case 2. The armature winding 18 is composed of a plurality of concentrated winding coils prepared for three phases and molded integrally with the insulating laminated body 40. An electric power is supplied to the armature winding 18 from a terminal base 15 attached to the case 2. The terminal base 15 is electrically connected to the armature winding 18 by a lead wire (not shown in the drawing). Further, a refrigerant is supplied from a refrigerant supply port 16 provided in the case 2 and discharged from a refrigerant discharge port 17. During that time, the refrigerant is allowed to flow in a refrigerant passage 5 located between the insulating laminated body 40 and the can 3 to cool the armature winding 18 that generates heat.

Figure 8:
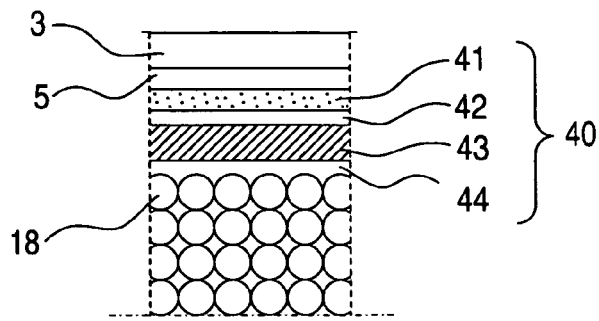
FIG. 8 is an enlarged view of a part B in FIG. 7B showing the third embodiment.

FIG. 8 is an enlarged view of a part B in FIG. 7B showing the third embodiment.

In the drawing, reference numeral 41 designates a protecting resin layer, 42 designates an adhesive resin layer, 43 designates a main insulating resin layer, and 44 designates a mold resin layer. The insulating laminated body 40 is formed by laminating the protecting resin layer 41, the adhesive resin layer 42, the main insulating resin layer 43 and the mold resin layer 44 from the refrigerant passage 5 side. The protecting resin layer 41 serves to suppress the absorption of a refrigerant to the main insulating resin layer 43 side and protect the main insulating resin layer 43. Accordingly, for the protecting resin layer 41, a polyimide resin or a nylon resin is used that has a low coefficient of water absorption and is not broken even with a small thickness. The adhesive resin layer 42 serves to bond or stick the protecting resin layer 41 to the main insulating resin layer 43. Accordingly, for the adhesive resin layer 42, an epoxy, silicone or acrylic adhesive agent or pressure sensitive adhesive is employed. The main insulating resin layer 43 serves to suppress the absorption of the refrigerant, ensure a refrigerant insulation resistance and assure a long-period insulation without being softened even when the temperature rises due to the heat generation of the armature winding 18. Accordingly, for the main insulating resin layer 43, an epoxy resin or a polyethylene resin is used as a resin material low in its coefficient of water absorption and high in its insulation resistance. Since the mold resin layer 44 serves to attach the armature winding 18 integrally to the main insulating resin layer 43, the epoxy resin that is ordinarily employed as a mold material is used.

The third embodiment is different from the Patent Document 1 in a point that the insulating laminated body formed by laminating the resin layers in the multi-layers is provided between the armature winding located in the stator and the refrigerant.

According to such a structure, even when pin holes are formed in the coating of the conductor of the armature winding, the reaction of a thrust is generated, the heat of the armature winding is generated or high voltage is applied, the resin layers composed of the multi-layers play the role of a refrigerant insulation resistance and the deterioration of the insulation resistance can be suppressed under an immersion in water having a high electric conductivity to prevent the breakdown for a long period. Further, since the protecting resin layer protects the main insulating resin layer, even when scars (pin holes) are formed in the main insulating resin layer during a manufacturing operation, the protecting resin layer can prevent can prevent the parts of the pin holes from being directly impregnated with water to suppress the progress of the pin holes to cracks and ensure a reliability of a long-period insulation. As a result, the water as the refrigerant high in its cooling capability can be used and the rise of the temperature on the surface of the linear motor can be decreased.

Embodiment 4

Now, a fourth embodiment of the present invention will be described below.

Figure 9:
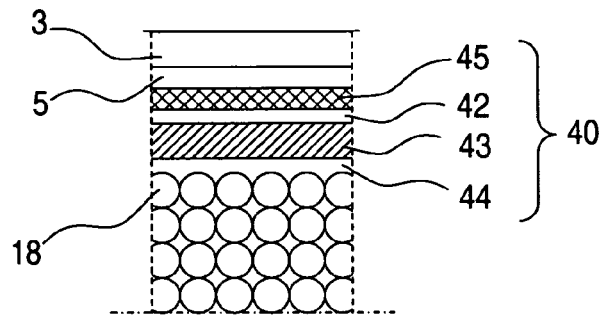
FIG. 9 is an enlarged view of the part B in FIG. 7B showing the fourth embodiment.

FIG. 9 is an enlarged view of the part B in FIG. 7B showing a fourth embodiment. In the drawing, reference numeral 45 designates a metal layer. The fourth embodiment is different from the third embodiment in that that the protecting resin layer 41 of the insulating laminated body 40 is replaced by the metal layer 45. The metal layer 45 serves to shut off the absorption of a refrigerant to a main insulating resin layer 43 as well as to protect the main insulating resin layer 43 like the protecting resin layer 41 used in the third embodiment. As the metal layer 45, thin stainless steel, a silicon steel plate or the like is used.

According to the above-described structure, a breakdown can be prevented for a long period even under an immersion in water high in its electric conductivity as in the third embodiment. Further, since the metal layer shuts off the absorption of the refrigerant to an inner part, the deterioration of an insulation resistance due to the absorption of water of the main insulating resin layer can be eliminated. As a result, even when the water having the high electric conductivity is used as the refrigerant, the rise of temperature on the surface of a linear motor can be decreased without generating the deterioration of the insulation resistance or the breakdown of an armature winding.

Embodiment 5

Now, a fifth embodiment of the present invention will be described below.

Figure 10:
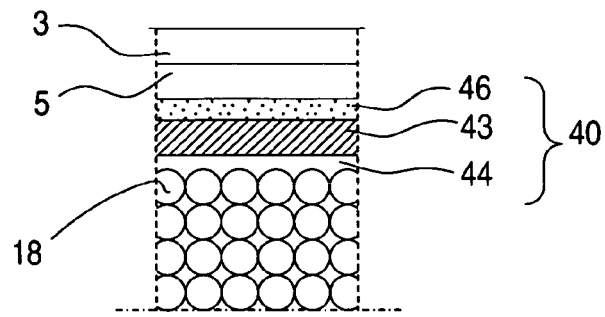
FIG. 10 is an enlarged view of the part B in FIG. 7B showing the fifth embodiment.

FIG. 10 is an enlarged view in the part B in FIG. 7B showing a fifth embodiment.

In the drawing, reference numeral 46 designates a metal foil tape. The fifth embodiment is different from the fourth embodiment in that the metal layer 45 and the adhesive resin layer 42 are replaced by the metal foil tape 46. The metal foil tape 46 has an adhesive agent or a pressure sensitive adhesive provided on one surface of a thin metal foil.

In the above-described structure, since the metal layer and the adhesive resin layer are replaced by the very thin metal foil tape to reduce the thickness of an insulating laminated body and increase the thickness of a refrigerant passage, the rise of temperature on the surface of a linear motor can be more decreased.

Embodiment 6

Now, a sixth embodiment of the present invention will be described below.

Figure 11:
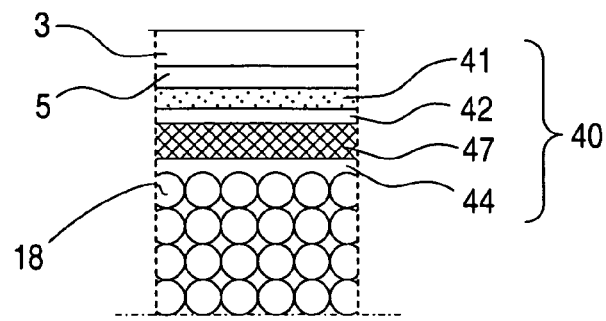
FIG. 11 is an enlarged view of the part B in FIG. 7B showing the sixth embodiment.

FIG. 11 is an enlarged view of the part B in FIG. 7B showing a sixth embodiment. In the drawing, reference numeral 47 designates a high strength insulating resin layer.

The sixth embodiment is different from the third to fifth embodiments in a point that the main insulating resin layer 43 is replaced by the high strength insulating resin layer 47 filled with glass fibers or carbon fibers.

According to such a structure, since the mechanical strength of an insulating laminated body can be improved, even when the reaction of a thrust or heat is generated in an armature winding, the generation of cracks can be prevented on the insulating laminated body and a breakdown due to the immersion of the crack parts in water can be prevented. Accordingly, reliability for insulation for a mechanical stress or a thermal stress can be more improved than those of the third to fifth embodiments.

Embodiment 7

Figure 12:
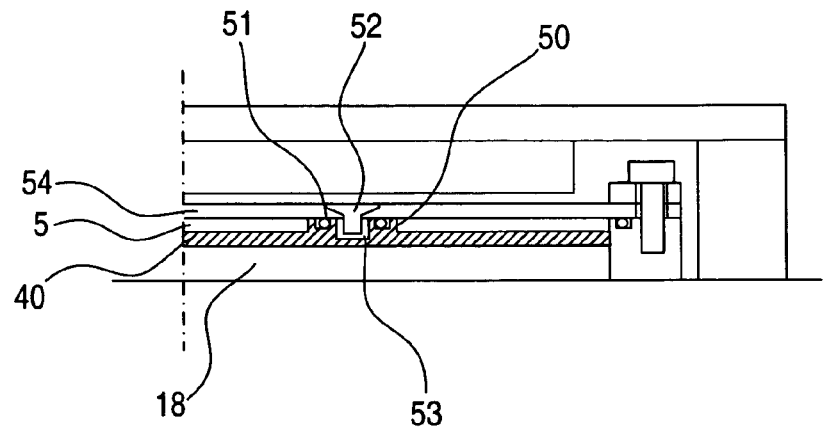
FIG. 12 is a front sectional view of a canned linear motor showing the seventh embodiment with a section cut to ¼ along a line A-A' in FIG. 7A.

Now, a seventh embodiment of the present invention will be described below;

FIG. 12 is a front sectional view of a canned linear motor showing a seventh embodiment with a section cut to ¼ along a line A-A' in FIG. 7A.

In the drawing, referent numeral 50 designates a post, 51 designates an O ring for the post; 52 designates a post fixing bolt, 53 designates a post fixing insert nut, and 54 designates a can for a post. The seventh embodiment is different from the third to sixth embodiments in a point that the post 50 is provided in a refrigerant passage 5. The post 50 is formed integrally with a main insulating resin layer 43 or a high strength insulating resin layer 47. In an end of the post 50, the O ring 51 for the post is placed and the post fixing insert nut 53 is embedded. The post is mechanically fastened to the can for the post 54 by the post fixing bolt 52.

According to such a structure, even when pressure in the refrigerant passage is elevated in accordance with the increase of the flow rate of a refrigerant, a quantity of the deformation of the can may be suppressed. Accordingly, the flow rate of the refrigerant can be increased and the rise of temperature on the surface of a linear motor can be more decreased.

Embodiment 8

Now, an eighth embodiment of the present invention will be described below.

Figure 13:
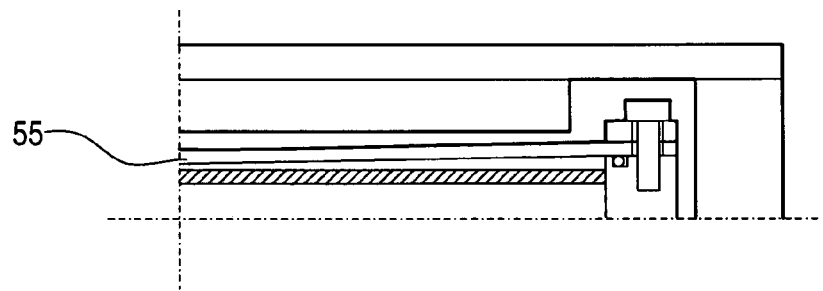
FIG. 13 is a front sectional view of a canned linear motor showing the eighth embodiment with a section cut to ¼ along a line A-A' in FIG. 7A.

FIG. 13 is a front sectional view of a canned linear motor showing an eighth embodiment with a section cut to ¼ along the line A-A' in FIG. 7A. In the drawing, referent numeral 55 designates a curved can. The eighth embodiment is different from the seventh embodiment in a point that the post 50 provided in the refrigerant passage 5 is removed and the can 55 previously curved in a V shape is arranged so as to direct a convex surface to the refrigerant passage 5 side.

According to the above-described structure, even when pressure in the refrigerant passage is elevated as in the seventh embodiment, a quantity of bulge of the can to an outer part can be suppressed. Accordingly, the flow rate of a refrigerant can be increased and the rise of temperature on the surface of a linear motor can be decreased. Further, since a member such as the post is not used as compared with the seventh embodiment, a manufacture can be easily and inexpensively carried out.

Embodiment 9

Now, a ninth embodiment of the present invention will be described below.

Figure 14:
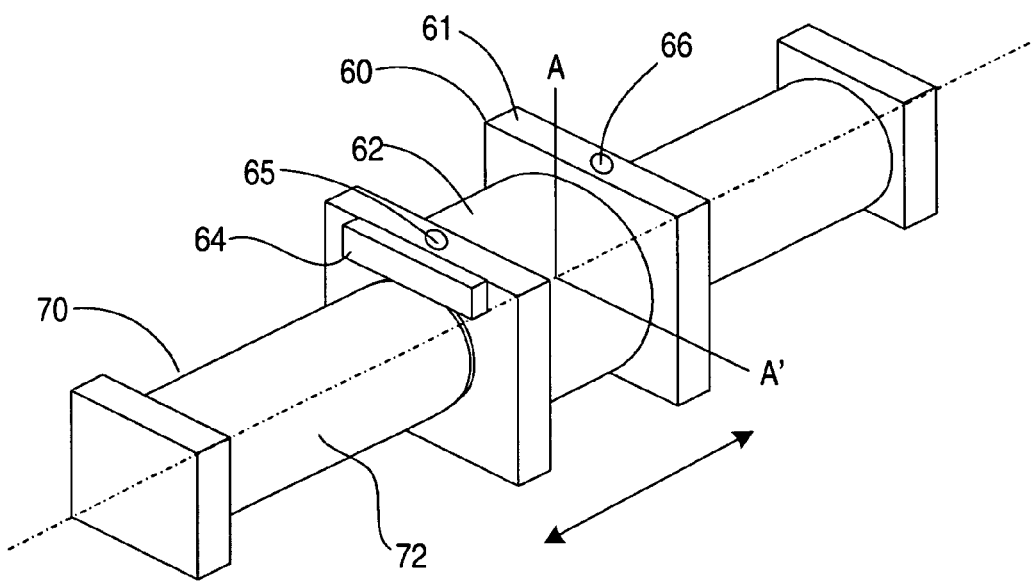
FIG. 14 is an entire perspective view of a canned linear motor showing a ninth embodiment.
Figure 17:
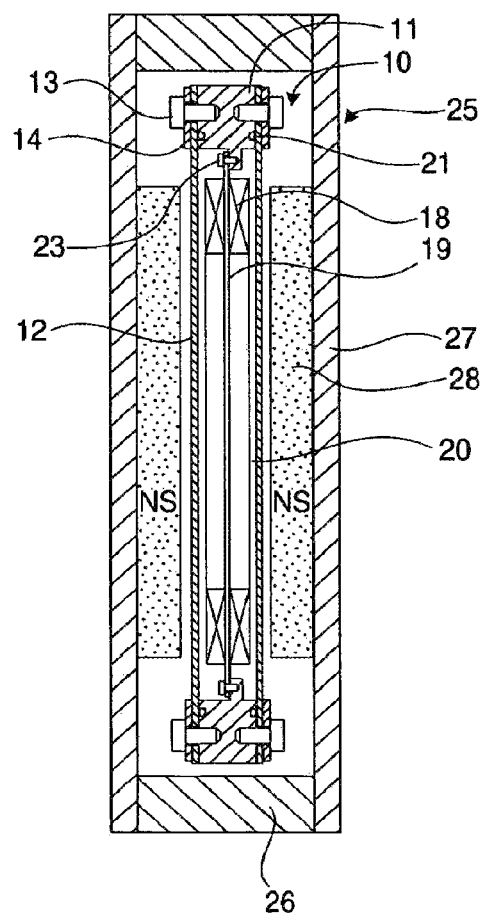
FIG. 17 is a front sectional view of the canned linear motor taken along a line A-A in FIG. 16.
Figure 18:
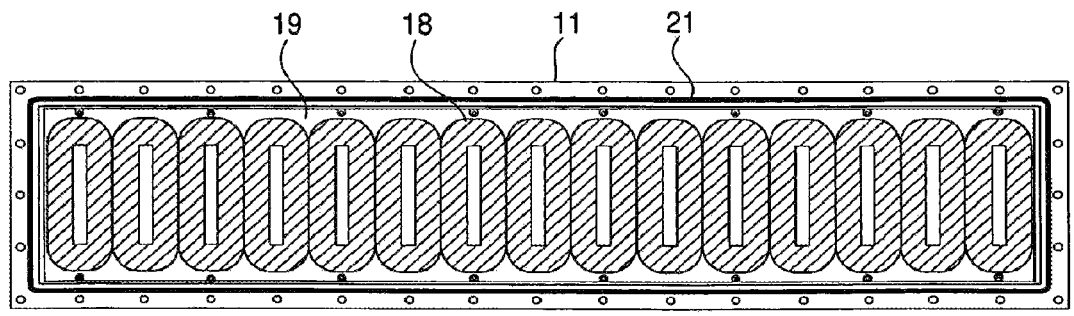
FIG. 18 is a side view showing an inner structure of a stator with a can shown in FIG. 17 removed.

FIG. 14 is an entire perspective view of a canned linear motor showing a ninth embodiment of the present invention. FIG. 15 is a front sectional view showing a section cut to ¼ along a line A-A' in FIG. 14.

In the drawing, reference numeral 60 designates a movable element, 61 designates a case, 62 designates a can, 63 designates an armature winding, 64 designates a terminal base, 65 designates a refrigerant support port, 66 designates a refrigerant discharge port, 67 designates a refrigerant passage, 68 designates an insulating laminated body, 70 designates a stator, 71 designates a field yoke, and 72 designates a permanent magnet. The stator 70 includes a plurality of permanent magnets 72 forming multi-poles that are arranged in the outer periphery of the cylindrical field yoke 71 long in the direction of a stroke. On the other hand, the movable element 60 has the armature winding 63 provided in an intermediate part and the insulating laminated bodies 68, the refrigerant passages 67 and the cans 62 provided in the inner and outer peripheries thereof. Here, for the case 61 and the can 62, stainless steel is used and the case is connected to the can by welding. Further, the armature winding 63 is molded integrally with a winding fixing frame (not shown in the drawing) and fixed to the case 61 by bolts. A refrigerant is supplied from the refrigerant supply port 65 provided in one case 61, then passes a pipeline in the other case 61 and is discharged from the refrigerant discharge port 66. The movable element 60 has the stator 70 inserted in its hollow space and is supported by a linear guide or a static pressure bearing guide that is not illustrated. In the above-described structure, a prescribed current is allowed to flow in the armature winding 63 so that a thrust is generated in the movable element 60 in accordance with an action on a magnetic filed formed by the permanent magnets 72 and the movable element 60 moves in an advancing direction shown by an arrow mark. At that time, heat generated in the armature winding is recovered by the refrigerant flowing on the surface thereof. Thus, it is possible to greatly reduce the temperature rise on the surface of the can.

Further, a structure having a part B enlarged in FIG. 15 is the same as those of the third to sixth embodiments and the same as those shown in FIGS. 8 to 11 formed in circular arc shapes. As described above, the ninth embodiment is different from the third to eighth embodiments in a point that the armature winding and the permanent magnets are formed in cylindrical shapes.

According to the above-described structure, water having a high cooling capability can be used as the refrigerant as in the third to sixth embodiments and the rise of the temperature on the surface of a linear motor can be decreased. Further, in the third to eighth embodiments, the armature winding forming the armature and the permanent magnet forming the field magnet are formed in the flat plate shapes to have the flat canned linear motor. However, in the ninth embodiment, the cylindrical form is used so that a coil end part of the armature winding can be eliminated and the canned linear motor small in its volume can be provided.

In the first to eighth embodiments, the structure is mentioned that has the armature winding as the stator and the permanent magnet of the field magnet as the movable element. In the ninth embodiment, the structure is mentioned that has the armature winding as the movable element and the permanent magnets of the field magnet as the stator. However, inverse structures may be employed respectively for the above-described structures. Further, although the movable element is formed in a rectangular shape having a hollow in the third to eighth embodiments, it is apparent that the present invention may be applied with the movable element having the recessed form or a structure in which the permanent magnets are merely arranged in one side. Further, as described above, the armature winding is explained as the three-phase ac linear motor composed of a plurality of concentrated winding coils. However, what is called a voice coil motor (VCM) in which one concentrated winding coil is provided or an extremely freely operating VCM in which a plurality of movable elements and a plurality of concentrated winding coils are provided may be employed. Further, as described above, the winding fixing part (not shown in the drawing) as a member for fixing the armature winding to the case is used. However, the winding fixing part may be formed integrally with the main insulating resin layer or the high strength resin layer. Further, as described above, the post is formed integrally formed with the main insulating resin layer or the high strength resin layer. However, it is to be understood that the post may be formed separately from these resin layers or the post may be formed integrally with the can to obtain the same effects. Still further, as described above, the curved can is formed in the V shape, it is to be recognized that the can may be formed in a bowl shape or a recessed shape (stair-like shape) to obtain the same effects.

INDUSTRIAL APPLICABILITY

In the present invention, the resin layers of the multi-layers of the resin layer and/or the metal layer are interposed between the armature winding and the refrigerant. Accordingly, even when the water is used as the refrigerant having a high electric conductivity, the deterioration of an insulation resistance or a breakdown does not arise and the temperature rise of the linear motor can be decreased. Therefore, the present invention may be applied to a semiconductor exposure device or an inspection device, in which a temperature rise is required to be extremely small and a reliability of a long-period insulation is also required.

The invention claimed is:

1. A canned linear motor armature comprising: an armature winding that includes a plurality of groups of coils; a can that is provided on one side or both sides of the armature winding; and a refrigerant passage that is formed between the armature winding and the can, wherein an insulating laminated body, in which resin layers are laminated in multi-layers, is interposed between the armature winding and the refrigerant passage wherein the resin layers comprise a mold resin layer, and the armature winding is molded integrally with the insulating laminated body such that a gap between the armature winding and the insulating laminated body is filled with the mold resin layer.

2. The canned linear motor armature according to claim 1, wherein a metal layer is laminated on the resin layers of the insulating laminated body.

3. The canned linear motor armature according to claim 2, wherein the metal layer is formed by a metal foil tape having a metal foil and an adhesive agent or a pressure sensitive adhesive.

4. The canned linear motor armature according to claim 1, wherein one of the resin layers is filled with a glass fiber or a carbon fiber.

5. The canned linear motor armature according to claim 1, further comprising a post provided in the refrigerant passage, wherein the post fixes the can and the resin layers.

6. The canned linear motor armature according to claim 1, wherein the can is curved, and a curved convex surface of the can is arranged to be directed to a refrigerant passage side.

7. A canned linear motor comprising:
the canned linear motor armature according to claim 1; and
a field magnet that is disposed so as to oppose to the canned linear motor armature interposing a magnetic gap there between, and that includes a plurality of permanent magnets arranged such that each permanent magnet has a different polarity with the adjacent permanent magnet, wherein either one of the canned linear motor armature or the field magnet is considered to be a stator and the other is considered to be a movable element, and the field magnet and the canned linear motor armature move relatively to each other.

8. The canned linear motor according to claim 7, wherein the canned linear motor armature and the field magnet are formed in a flat plate shape.

9. The canned linear motor according to claim 7, wherein the canned linear motor armature and the field magnet are formed in a cylindrical shape.

* * * * *